J. C. MELGER.
SWINGLETREE CLIP.
APPLICATION FILED MAY 8, 1917.
1,240,238.
Patented Sept. 18, 1917.
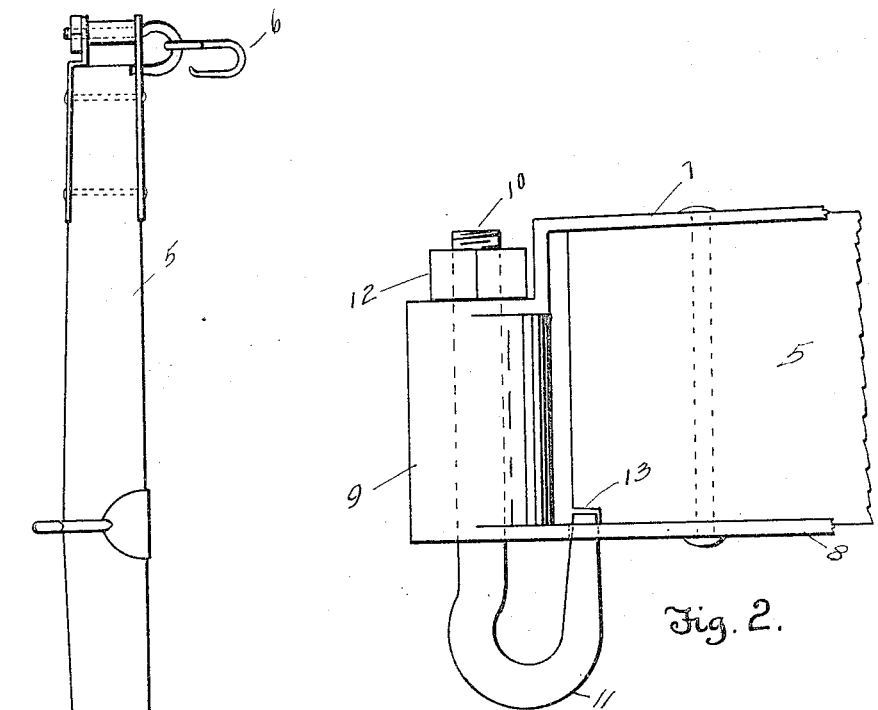
Fig. 2.
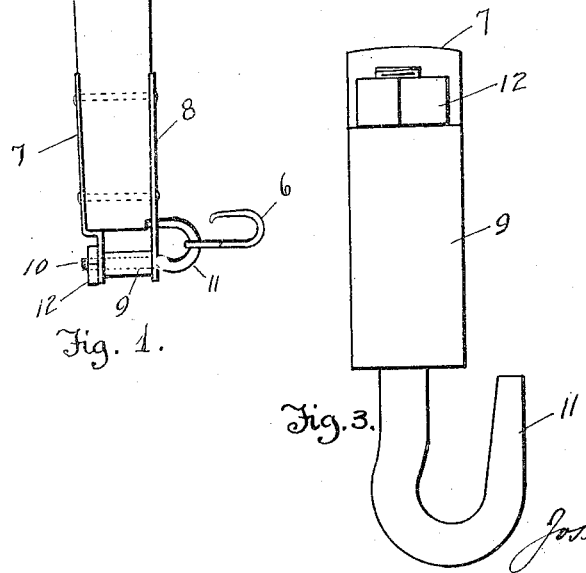
Fig. 1.
Fig. 3.
Inventor
Joseph C. Melger
By Max A. Schmidt
Attorney.

UNITED STATES PATENT OFFICE.

JOSEPH C. MELGER, OF WALLA WALLA, WASHINGTON.

SWINGLETREE-CLIP.

1,240,238.  Specification of Letters Patent.  Patented Sept. 18, 1917.

Application filed May 8, 1917. Serial No. 167,241.

*To all whom it may concern:*

Be it known that I, JOSEPH C. MELGER, a citizen of the United States, residing at Walla Walla, in the county of Walla Walla and State of Washington, have invented certain new and useful Improvements in Swingletree-Clips, of which the following is a specification.

This invention relates to devices for attaching the traces to a swingletree, and its object is to provide a novel and improved clip which carries a hook to which latter the traces are connected, the clip being so constructed and mounted that the hook can be easily attached or removed.

In order that the invention may be better understood, reference is had to the accompanying drawing forming a part of this specification, and in said drawing, Figure 1 is a plan view showing the application of the invention;

Fig. 2 is a plan view showing a slight modification, and

Fig. 3 is an end view of the clip showing the same swung open for attachment or removal of the hook.

Referring specifically to the drawing, 5 denotes a swingletree carrying at each end a hook 6 for attachment of the traces, the latter not being shown as they form no part of the present invention. Each hook is attached to the swingletree by a clip composed of the following parts:

On opposite sides of the swingletree 5, at the end thereof, are secured plates 7 and 8, respectively, projecting a short distance from said end. Between the projecting ends of these plates is mounted a tubular spacing member 9 in which is rotatably and slidably mounted the shank 10 of a hook, the bill of the latter being shown at 11. The hook shank passes through the plates 7 and 8 and where it projects from the plate 7 it is screwthreaded to receive a nut 12 which is screwed down against said plate. The hook bill extends with an outward curve from the plate 8 and its extremity extends back to the latter and passes through an aperture therein. The hook is therefore entirely closed so that the hook or link 6 connected thereto cannot slip off.

In order to permit removal of the member 6 from the hook bill 11, the shank 10 is loosely mounted in the member 9, so that when the nut 12 is unscrewed, the shank may be advanced to take the extremity of the hook bill out of the aperture in the plate 8, after which the shank can be rotated to carry the hook bill to a position at a right angle to that shown in Fig. 1, whereupon it is open for removal or attachment of the member 6. Fig. 3 shows the hook in this position. The extremity of the hook bill 11 passes through the plate 8, and the swingletree 5 has an end notch or recess 13 to accommodate the same, as clearly shown in Fig. 2.

The structure shown in Fig. 2 is in all respects similar to the one hereinbefore described, with the exception of the spacing member between the plates 7 and 8, said member being here shown integral with said plates.

The end of the plate 7 which projects from the swingletree 5 is offset toward the plate 8 to accommodate the nut 12 and keep the same from rubbing the doubletree (not shown) to which the swingletree is attached in a well known manner.

I claim:

The combination with a swingletree, of plates mounted on opposite sides and projecting from the end thereof, the projecting end of one plate being offset inwardly toward the other plate, a tubular spacing member between the projecting ends of the plates, a hook having its shank rotatably and slidably seating in the spacing member, one end of the shank projecting from one of the plates, and a nut screwed on the projecting end of the shank and seating on the offset portion of the plate, the bill of the hook extending from the other end of the shank and the corresponding plate, said plate having an aperture to receive the extremity of the hook bill.

In testimony whereof I affix my signature.

JOSEPH C. MELGER.

Copies of this patent may be obtained for five cents each, by addressing the "Commissioner of Patents, Washington, D. C."